United States Patent [19]
Cochran et al.

[11] Patent Number: 5,764,102
[45] Date of Patent: Jun. 9, 1998

[54] MULTI-STAGE SYMBOL SYNCHRONIZATION

[75] Inventors: Bruce A. Cochran, Mesa; Ronald D. McCallister, Scottsdale, both of Ariz.

[73] Assignee: SiCOM, Inc., Scottsdale, Ariz.

[21] Appl. No.: 800,256

[22] Filed: Feb. 13, 1997

[51] Int. Cl.$^6$ .............................. H03D 3/00; H04L 27/00; H04L 27/22
[52] U.S. Cl. .............................. 329/304; 375/355; 375/324
[58] Field of Search .................................. 329/304–310; 375/324–333, 355, 376

[56] References Cited

U.S. PATENT DOCUMENTS

| | | | |
|---|---|---|---|
| 4,215,239 | 7/1980 | Gordy et al. | 375/114 |
| 4,652,834 | 3/1987 | McAdam | 329/50 |
| 5,440,265 | 8/1995 | Cochran et al. | 329/300 |
| 5,671,257 | 9/1997 | Cochran et al. | 375/355 |

*Primary Examiner*—David Mis
*Attorney, Agent, or Firm*—Meschkow & Gresham, P.L.C.; Lowell W. Gresham; Jordan M. Meschkow

[57] ABSTRACT

A digital communication receiver (#10) takes one complex sample (#20) of a baseband analog signal (#12) per symbol. A rectangular to polar converter (#44) separates phase attributes of the complex samples from magnitude attributes during coarse symbol synchronization (#28). A phase processor (#48) identifies clock adjustment opportunities which occur when relatively large phase changes take place between consecutive symbols. A magnitude processor (#46) influences symbol timing only during clock adjustment opportunities. The magnitude processor (#46) advances symbol timing in a phase locked loop when decreasing magnitude changes are detected during clock adjustment opportunities and retards symbol timing when increasing magnitude changes are detected during clock adjustment opportunities during coarse symbol synchronization (#28). A fine symbol synchronizer (#42) is used to refine coarse estimates of symbol synchronization in a data-directed manner (#82) by estimating incoming signal at sub-symbol intervals before and sampling instants to control oscillator (#22) in response to incoming signal estimates.

19 Claims, 5 Drawing Sheets

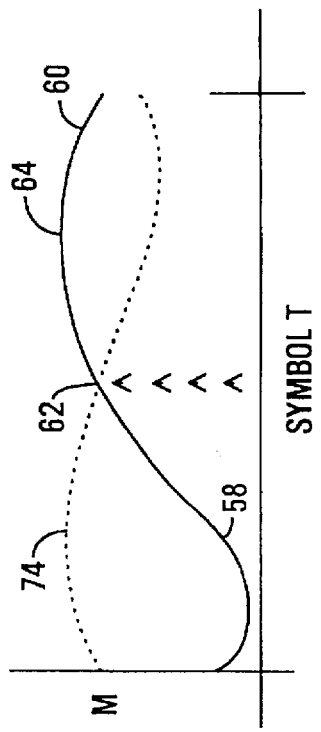
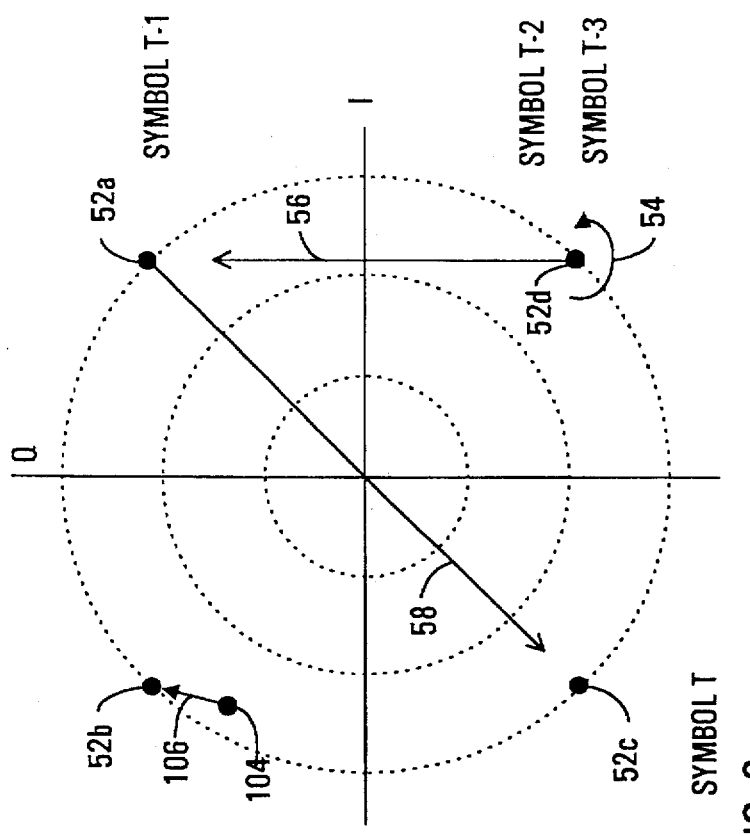
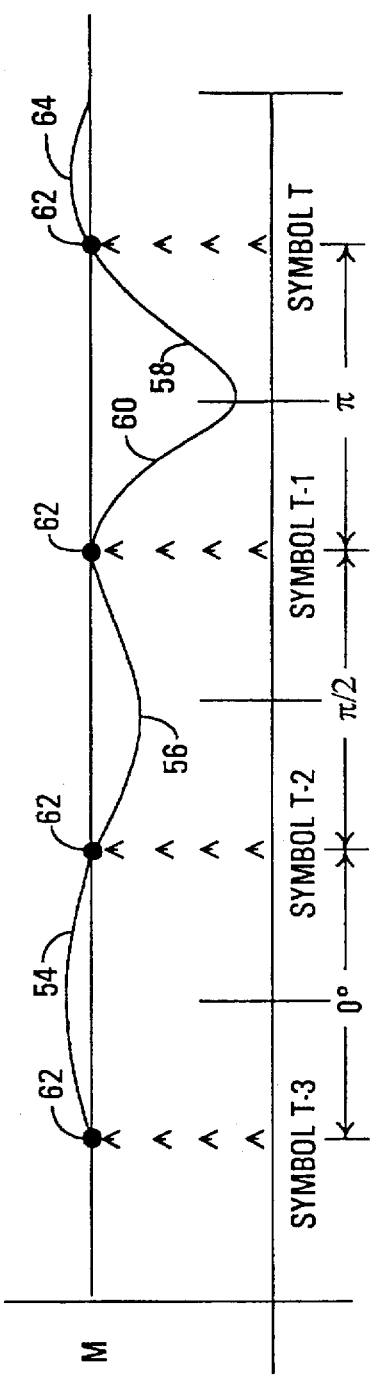
FIG. 5
FIG. 3
FIG. 4

MULTI-STAGE SYMBOL SYNCHRONIZATION

TECHNICAL FIELD OF THE INVENTION

The present invention relates generally to demodulators. More specifically, the present invention relates to digital demodulators that recover data conveyed by the phase and/or magnitude of an incoming signal through a stream of symbols.

BACKGROUND OF THE INVENTION

In digital communication receivers, component cost, reliability, and power consumption improvements may be realized by operating at lower clock rates or by requiring fewer components. However, the purpose of a digital communication receiver is to recover transmitted information, and greater amounts of information may be recovered when receivers detect data at higher data rates. Conventionally, operation at higher data rates requires operating integrated circuits at higher clock rates or increasing the number of components while simultaneously operating parallel channels.

One particularly troublesome feature of digital communication receivers has been symbol synchronization. A symbol is a discrete interval of time within which a received signal conveys a unit of data. The unit of data may include one or more bits, and the resulting data rate is proportional to the symbol rate. Conventional digital communication receivers compute symbol synchronization timing errors by detecting points where quadrature components of complex signals experience zero-crossings. Unfortunately, these points are difficult to detect. Consequently, symbol synchronization in conventional digital communication receivers has required an incoming analog signal to be sampled at a rate of two or more complex samples per symbol.

U.S. Pat. No. 5,440,265, assigned to the assignee of the present invention, teaches a differential/coherent digital demodulator that works well for its purposes and does not detect zero crossing points, but uses error signals derived from samples taken one-fourth of a symbol before and after an assumed optimum symbol sampling instant. Unfortunately, this method requires four accurate samples per symbol.

Once symbol synchronization has been achieved, only one complex sample per symbol is actually used for data detection. Thus, the symbol synchronization feature has conventionally required digital receivers to operate at a greater clock rate than is needed for data detection. It is desirable to sample at a rate no higher than one sample per symbol because this rate increases symbol rate to equal a maximum clock rate supported by an integrated circuit technology, such as CMOS, which may be used to implement a demodulator. Alternatively, this rate allows components to be clocked no faster than a symbol rate so that the components consume less power.

A few prior digital receivers have achieved symbol synchronization using only one complex sample per symbol. However, such digital receivers have been extremely sensitive to carrier synchronization and frequency offsets, such as may be caused by Doppler. In addition, such receivers can be undesirably jittery using modulation techniques where data is conveyed by signal amplitude, such as QAM. As such, these prior digital receivers are useful only in situations which require carrier synchronization along with rigid control of frequency offsets. These receivers are unsuitable for situations which require fast acquisition, operation in the presence of significant frequency offsets, or amplitude modulation.

SUMMARY OF THE INVENTION

Accordingly, it is an advantage of the present invention that an improved symbol synchronization apparatus and method are provided.

Another advantage is that the present invention may digitally recover symbol timing based upon less than two complex samples per symbol.

Another advantage is that the present invention tolerates significant frequency offsets.

Another advantage is that the present invention quickly acquires coarse symbol timing.

Another advantage is that the present invention achieves steady symbol synchronization in spite of amplitude types of modulation.

Another advantage is that the present invention continually adjusts fine synchronization during data extraction by advancing or retarding sampling instants in response to pre-sample and post-sample estimates of an incoming signal.

The above and other advantages of the present invention are carried out in one form within a digital communication receiver by a method of recovering data conveyed by an incoming analog signal. The incoming analog signal is sampled at a rate of less than two complex samples per symbol. A coarse symbol synchronizer performs an initial estimate of symbol synchronization and defines initial sampling instants. A fine symbol synchronizer receives and refines initial estimates of symbol synchronization in a data-directed manner and estimates incoming signal magnitudes at sub-symbol intervals before and after sampling instants. Fine symbol synchronization is continually refined at the same time data extraction is being performed.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a phase constellation diagram;

FIG. 4 shows a timing diagram of an exemplary magnitude signal;

FIG. 5 shows a timing diagram of an exemplary magnitude signal and a delayed estimate of the magnitude signal;

DETAILED DESCRIPTION OF THE PREFERRED EMBODIMENTS

Figure 1:
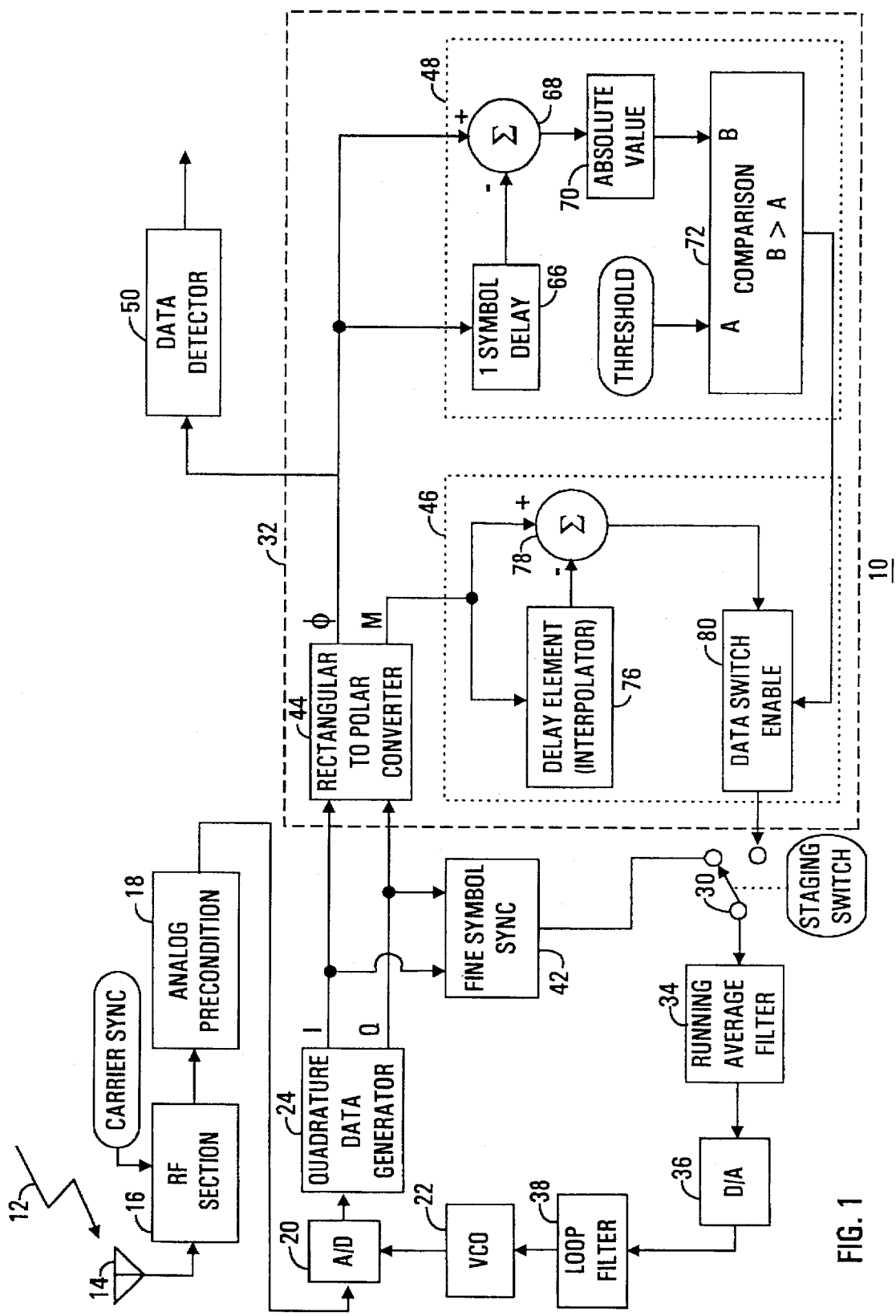
FIG. 1 shows a block diagram of a digital communication receiver configured in accordance with the present invention.

FIG. 1 shows a block diagram of a digital communication receiver #10. Receiver #10 recovers digital data from an incoming analog carrier signal #12. Carrier signal #12 is configured as a stream of discrete symbol intervals, called symbols below. The symbols are of equivalent duration, and each symbol conveys a unit of data. A unit of data conveys one or more bits. Desirably, signal #12 is modulated using some form of non-constant-envelope modulation, such as M-ary PSK, QAM, and the like.

Signal #12 is received at an antenna #14. Antenna #14 couples to an RF section #16. RF section #16 may include RF filtering, a fixed frequency oscillator, a variable frequency oscillator, down-conversion circuits, and other components conventionally included in RF sections of radio receivers. RF section #16 preferably generates an essentially baseband, analog form of signal #12. A control input of RF circuit #16 receives a carrier synchronization control signal from a controller or phase locked loop circuit (not shown). This control signal may be generated in a conventional manner in response to data detected by receiver #10. An output of RF section #16 couples to an input of an analog precondition circuit #18. Circuit #18 includes anti-aliasing filtering, automatic gain control (AGC), and other circuits commonly used to condition an analog signal for digitizing. An output of precondition circuit #18 couples to a signal input of an analog-to-digital (A/D) converter #20. A/D converter #20 digitizes the baseband form of signal #12 into samples which characterize the amplitude of the baseband form of signal #12 at various sampling instants.

An output of a voltage controlled oscillator (VCO) #22 generates a clock signal that defines the timing at which A/D converter #20 samples signal #12. In the preferred embodiment, VCO #22 oscillates at less than two times the symbol rate for signal #12, and preferably at approximately one times the symbol rate. A/D converter #20 takes less than two and preferably just one complex sample for each symbol. Those skilled in the art will appreciate that a complex sample may include two measurements taken 90 degrees out of phase with each other.

An output of A/D converter #20 couples to a quadrature data generator #24. Quadrature data generator #24 converts the digital samples of signal #12 into digital rectangular coordinate characterizations of the signal's I and Q quadrature components. The preferred embodiment uses a well-known Hilbert transformation technique to convert sampled carrier data pairs into I and Q data values, but other techniques known to those skilled in the art may be used as well. These I and Q data values express I and Q quadrature components in accordance with a rectangular coordinate system. In the preferred embodiment, quadrature data generator #24 produces one complex sample which includes I and Q data values for each symbol.

Figure 2:
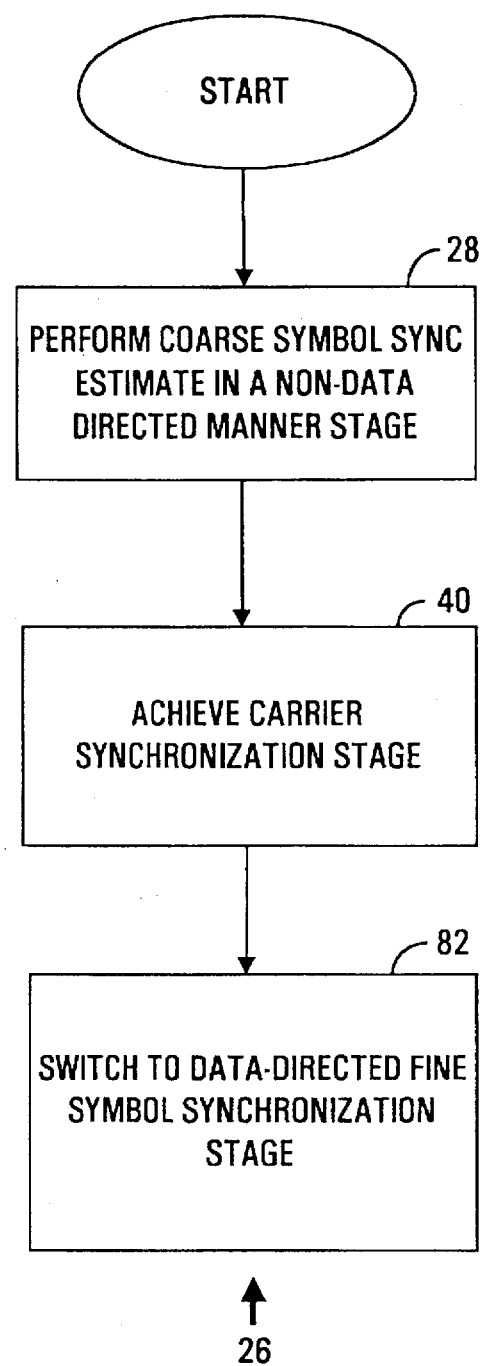
FIG. 2 shows a flow chart of synchronization stages of a digital communication receiver configured in accordance with the present invention.

FIG. 2 shows a flow chart of three stages of a synchronization process #26 performed by receiver #10. Referring to FIGS. 1 and 2, a first stage #28 of synchronization process #26 performs a coarse symbol synchronization estimate in a non-data-directed manner. The phrase "non-data-directed" will be understood by those skilled in the art to mean that the parameters of incoming signal #12 that are manipulated to convey data are not used to influence symbol synchronization. Referring to FIGS. 1 and 2, during coarse synchronization stage #28, a staging switch #30 allows an output of a coarse synchronizer #32 to connect to an input of a running average filter #34. A digital controller (not shown) generates a staging switch signal that controls staging switch #30 as receiver #10 progresses through process #26. An output of running average filter #34 is coupled to an input of a D/A converter #36. An output of D/A converter #36 is coupled to an input of a loop filter #38. An output of loop filter #38 is coupled to an input of VCO #22. The output of coarse synchronizer #32 is thus allowed to control the operation of controllable oscillator #22 during coarse synchronization stage #28. Coarse synchronization is achieved during stage #28 before receiver #10 proceeds to a second stage #40 of process #26.

Quadrature data generator #24 has an I output and a Q output, each of which couples to coarse synchronizer #32 and to a fine symbol synchronizer #42. Coarse symbol synchronizer #32 includes a rectangular-to-polar converter #44, a magnitude processor #46, and a phase processor #48. Phase processor #48 is configured to adjust symbol timing so that the complex sample taken for each symbol occurs at a desirable point within the symbol during first stage #28 of symbol synchronization. While coarse symbol synchronizer #32 works well by itself for many applications, fine symbol synchronizer #42 overcomes tendencies toward jitter experienced by those modulation formats, such as QAM, that use magnitude attributes of complex signals to convey data. An output of fine symbol synchronizer #42 is coupled to an input of staging switch #30.

Within coarse symbol synchronizer #32, rectangular-to-polar converter #44 generates phase angle ($\phi$) and magnitude (M) attribute values which correspond to phase relationships expressed between the I and Q quadrature values provided by quadrature data generator #24. In the preferred embodiment, a Cordic conversion process is used in separating phase attributes of complex samples from magnitude attributes, but those skilled in the art can adapt other techniques, such as table look-ups and the like, in particular applications. Converter #44 preferably makes one conversion for each symbol.

A phase output of converter #44 couples to phase processor #48 and to a data detector #50. Phase processor #48 processes phase values apart from magnitude values to aid in recovering symbol timing. For PSK forms of modulation, data detector #50 uses the phase values obtained from the complex samples to recover the data conveyed by signal #12. For QAM forms of modulation, data detector #50 may additionally use magnitude values, or data detector #50 may alternatively use I and Q values (not shown). An output from data detector #50 provides a stream of data corresponding to the data conveyed by signal #12. In addition, data detector #50 may provide soft decision data.

A magnitude output of converter #44 couples to a magnitude processor #46. Magnitude processor #46 processes magnitude values to aid in recovering coarse symbol timing. In particular, magnitude processor #46 receives an enabling input from phase processor #48. This enabling input identifies when to allow magnitude attribute data to influence adjustments made to symbol timing. An output from magnitude processor #46 couples to staging switch #30 to allow coarse synchronizer #32 to control VCO #22 during coarse synchronization stage #28, as described above.

The operation of coarse symbol synchronizer #32 is described below in connection with FIGS. 1 and 3–5. FIG. 3 shows a phase constellation diagram for QPSK modulation. Those skilled in the art will appreciate that FIG. 3 illustrates QPSK modulation as a convenient example which aids teaching the present invention and that the present invention is not limited to this form of modulation. FIG. 3 depicts four complex points #52a, #52b, #52c, and #52d. Points #52a–#52d illustrate theoretically ideal relationships between inphase (I) and quadrature (Q) components of signal #12 for the purpose of conveying two bits of data in a single symbol. Only one of the relationships depicted by complex points #52a–#52d is conveyed during any single symbol. A/D converter #20, quadrature data generator #24, and rectangular-to-polar converter #44 (see FIG. 1) together generate a complex sample for each symbol which desirably resembles one of points #52a–#52d. However, this complex sample invariably fails to precisely equal any of points #52a–#52d due to the presence of noise and other factors.

Data detector #50 (see FIG. 1) identifies the particular two bits of data being conveyed during a symbol by determining which one of the complex points #52a–#52d the complex sample most closely resembles.

In addition to noise, symbol timing is one of the factors that determines how closely the complex samples resemble points #52a–#52d. Transition tracks #54, #56, and #58 depict exemplary changes which can occur in I-Q relationships as data conveyed by signal #12 (see FIG. 1) changes from one symbol to the next. If symbol timing is not approximately correct, the complex samples upon which receiver #10 (see FIG. 1) operate may correspond to any location on a transition track #54, #56, or #58 rather than to points #52a–#52d. Consequently, the farther a sampling instant is within a symbol from approximately correct symbol timing, the more likely that data detector #50 will generate bad data.

FIG. 3 illustrates that both phase and magnitude attributes of the complex relationship change as signal #12 transitions among points #52a–#52d. The phase attribute may further change due to other normally encountered factors, such as frequency offsets caused by imperfect carrier synchronization, Doppler, and the like. The influence of frequency offsets on the phase attribute makes the use of phase information to determine proper symbol timing undesirable prior to carrier synchronization. A significant portion of phase information may characterize frequency offsets rather than legitimate transitions between points #52a–#52d. On the other hand, the magnitude attribute changes as signal #12 transitions between points #52a–#52d but remains relatively insensitive to frequency offsets.

FIG. 4 shows a timing diagram of an exemplary magnitude component #60 of signal #12 as it transitions from a symbol T-3, through symbols T-2, T-1, and T. FIG. 4 illustrates a particular set of data conveyed by signal #12 during symbols T-3 through T as an example for the purpose of teaching the present invention. Those skilled in the art will appreciate that the present invention is not limited to any particular data combinations. The exemplary data combination depicted in FIG. 4 transitions zero radians in phase between symbols T-3 and T-2, π/2 radians in phase between symbols T-2 and T-1, and π radians between symbols T-1 and T. Thus, magnitude component #60 depicts the magnitude attribute of transition tracks #54, #56, and #58, respectively, shown in FIG. 3.

Desirably, sampling instants #62 are centrally located within the symbols and occur in receiver #10 when signal #12 most closely exhibits the I-Q relationships depicted by points #52a–#52d (see FIG. 3). Generally, magnitude changes little when phase changes little, but magnitude generally decreases then increases between sampling instants #62 as phase changes are encountered. Moreover, the amount of decrease and increase becomes more pronounced as the amount of phase change increases.

During transition track #54, magnitude information does not suggest how to adjust the VCO clock signal which defines symbol timing. Moreover, as illustrated in FIG. 4, magnitude may even exhibit a slight increase followed by a slight decrease during track #54, which is opposite to the magnitude signal behavior exhibited during tracks #56 and #58 where greater amounts of phase change are encountered. Accordingly, during track #54, any adjustment to symbol timing based upon magnitude attributes is at least as likely to diverge away from optimum sampling instants as it is to converge toward optimum sampling instants #62. Accordingly, magnitude change situations like those demonstrated by track #54 are undesirable clock adjustment opportunities.

On the other hand, tracks #56 and #58 illustrate a consistent signal behavior. As sampling instants #62 generally approach the points in time where the magnitude attribute reaches a maximum and move away from the points in time where the magnitude attribute reaches a minimum, then sampling instants #62 are roughly converging upon the optimum points. However, as illustrated at a point #64, sampling instants #62 are desirably not timed precisely where the magnitude attribute is maximized. In PSK modulation formats, overshoot or ringing often causes the magnitude attribute to reach a maximum after passing an optimum sampling instant #62. In QAM modulation formats, some data states are conveyed at a reduced magnitude compared to others. Accordingly, magnitude change situations like those demonstrated by tracks #56 and #58 are defined to be clock adjustment opportunities.

Referring back to FIG. 1, phase processor #48 evaluates phase attributes to distinguish clock adjustment opportunities from intervals which are not clock adjustment opportunities. However, phase processor #48 operates upon differential phase, which is relatively insensitive to frequency offsets. In particular, phase values for each symbol are supplied to a one symbol delay element #66 and to a positive input of a subtractor #68. An output of delay element #66 couples to a negative input of subtractor #68. An output of subtractor #68 couples to an absolute value element #70, and an output of absolute value element #70 couples to a "B" input of a comparison element #72. A constant threshold value is applied at an "A" input of comparison element #72. An output of comparison element #72 activates when a phase change value at the "B" input is greater than the threshold value at the "A" input. This output couples to magnitude processor #46.

At a current instant, delay element #66 provides a phase value which was valid for a past instant. In particular, the past instant is one symbol delayed from the current instant. Thus, subtractor #68 determines changes in phase attributes between consecutive symbols. These changes are relatively insensitive to frequency offsets because any frequency offset occurring over an interval of only a single symbol typically causes only a minor phase error. Absolute value element #70 strips away positive or negative sign information so that raw phase change data are provided to comparison element #72.

Phase processor #48 identifies clock adjustment opportunities in response to phase changes. Larger amounts of phase change occurring in a given unit of time (i.e. one symbol delay) are defined to be clock adjustment opportunities while smaller amounts of phase change are defined not to be clock adjustment opportunities. The threshold value supplied to the "A" input of comparison element #72 sets the threshold which defines the difference between clock adjustment opportunities and "not" clock adjustment opportunities. The precise value for this threshold is not a critical parameter in the present invention. Acceptable results appear to be obtainable so long as the threshold is set greater than π/4 radians, with even better results when the threshold is set to greater than π/2 radians.

The better results are a consequence of greater phase changes. Referring back to FIG. 4, during symbol T, maximum magnitude point #64 occurs significantly after desired sampling instant #62. For amounts of phase change greater than π/2 radians, point #64 occurs at approximately ¾ the duration of symbol T after the beginning of symbol T.

FIG. 5 shows a timing diagram of exemplary magnitude signal #60 during symbol T (see FIG. 3) while signal #60 follows transition track #58 (see FIGS. 3 and 4). In addition, FIG. 5 shows a delayed estimate #74 of magnitude signal #60. The intersection of delayed estimate signal #74 and magnitude signal #60 occurs approximately in the center of symbol T and is approximately coincident with desired sampling instant #62.

Referring back to FIG. 1, magnitude processor #46 includes a delay element #76 and a subtractor #78. A positive input of subtractor #78 and an input of delay element #76 each receive magnitude attributes of the I-Q relationship for each symbol. An output of delay element #76 couples to a negative input of subtractor #78. An output of subtractor #78 couples to a data input of a data switch #80. The enabling signal provided by comparison element #72 of phase processor #48 is routed to an enable input of data switch #80, and an output of data switch #80 couples to an input of staging switch #30. The output of data switch #80 serves as output for both magnitude processor #46 and coarse symbol synchronizer #32.

For each current instant, delay element #76 produces an estimate of the value exhibited by magnitude signal #60 (see FIG. 5) at a past instant. In the preferred embodiments, delay element #76 is an interpolator which has a fixed delay of one-half the symbol duration. Thus, for each symbol, delay element #76 provides an estimate of the value magnitude signal #60 would have exhibited had it been sampled one-half of a symbol earlier. In the preferred embodiment, a Farrow interpolation structure is used to estimate magnitude between samples, but those skilled in the art can adapt other interpolation and filtering techniques in particular applications. Consequently, delay element #76 generates delay estimate #74 (see FIG. 5) during symbol T.

Referring to FIGS. 1 and 5, those skilled in the art will appreciate that interpolator #76 need not precisely estimate a delayed version of magnitude signal #60 (see FIG. 5). For example, precise magnitude values are less important than the shape of delayed estimate #74 in response to various sampling instants throughout symbol T. For example, this shape causes delayed estimate to reach a maximum value prior to desired sampling point #62 and to reach a minimum value after desired sampling point #62 for the large phase change situation depicted by symbol T.

Subtractor #78 detects changes occurring in magnitude attributes over at least portions of symbols. This magnitude change between the estimated delayed magnitude and the current magnitude is fed through data switch #80 when enabled by phase processor #48. As discussed above, phase processor #48 enables data switch #80 during clock adjustment opportunities. Magnitude processor #46 and running average filter #34 are configured so that magnitude changes occurring while not a clock adjustment opportunity have substantially no influence over symbol timing.

The magnitude change data occurring during clock adjustment opportunities are used in a phase locked loop to adjust symbol timing. In particular, polarities are arranged so that decreasing magnitude changes urge VCO #22 to delay the clock signal so that sampling instant #62 is moved later within a symbol. The decreasing magnitude situation is depicted in the region to the left of desired sampling point #62 in FIG. 5. Likewise, increasing magnitude changes urge VCO #22 to advance the clock signal so that sampling instant #62 is moved earlier. The increasing magnitude situation is depicted in the region to the right of desired sampling point #62 in FIG. 5. Running average filter #34 and loop filter #38 together insure that the results from any single symbol have only a minor influence over symbol timing and general trends detected by magnitude processor #46 are used to control symbol timing during coarse synchronization stage #28 (see FIG. 2).

Referring back to FIG. 2, after performing coarse synchronization stage #28, a stage #40 is performed to achieve carrier synchronization in a conventional manner. Coarse symbol synchronization may be considered complete when sample timing changes from symbol to symbol are below an acceptable predetermined threshold. For example, during stage #40, a data-directed phase locked loop may be implemented to control a local oscillation signal generated in RF section #16 (see FIG. 1). Those skilled in the art will understand the phrase "data-directed" to mean that the convergence of a phase locked loop is controlled by the parameters that convey data. Once carrier synchronization has been achieved in stage #40, the symbol timing is sufficiently accurate to permit data extraction. However, due to symbol synchronization jitter caused by coarse synchronizer #32 when using some amplitude modulation formats, such as QAM for example, a phase locked loop may yield undesirably high bit error rates. The undesirably high bit error rates can be improved (i.e., lowered) through the use of fine symbol synchronizer #42 in a manner discussed below.

During carrier synchronization stage #40, staging switch #30 allows the output of coarse synchronizer #32 at data switch #80 to remain connected to the input of running average filter #34. Coarse carrier synchronization is complete when data accuracy exceeds a predetermined threshold. The predetermined threshold, however, is not as high as can ultimately be achieved. Carrier synchronization is achieved before process #26 proceeds to a fine symbol synchronization stage #82.

After achieving carrier synchronization #40, and upon entering fine symbol synchronization stage #82, staging switch #30 switches control of VCO #22 from coarse synchronizer #32 to fine synchronizer #42 (see FIG. 1). During stage #82 fine symbol synchronizer #42 receives each complex sample provided by quadrature data generator #24 and refines, in a data-directed manner, the initial coarse estimate of symbol synchronization achieved during stages #28 and #40. In other words, during fine symbol synchronization #82 the system extracts valid data at the output of data detector #50 while continuing to refine symbol synchronization timing estimates to improve data recovery accuracy.

Figure 6:
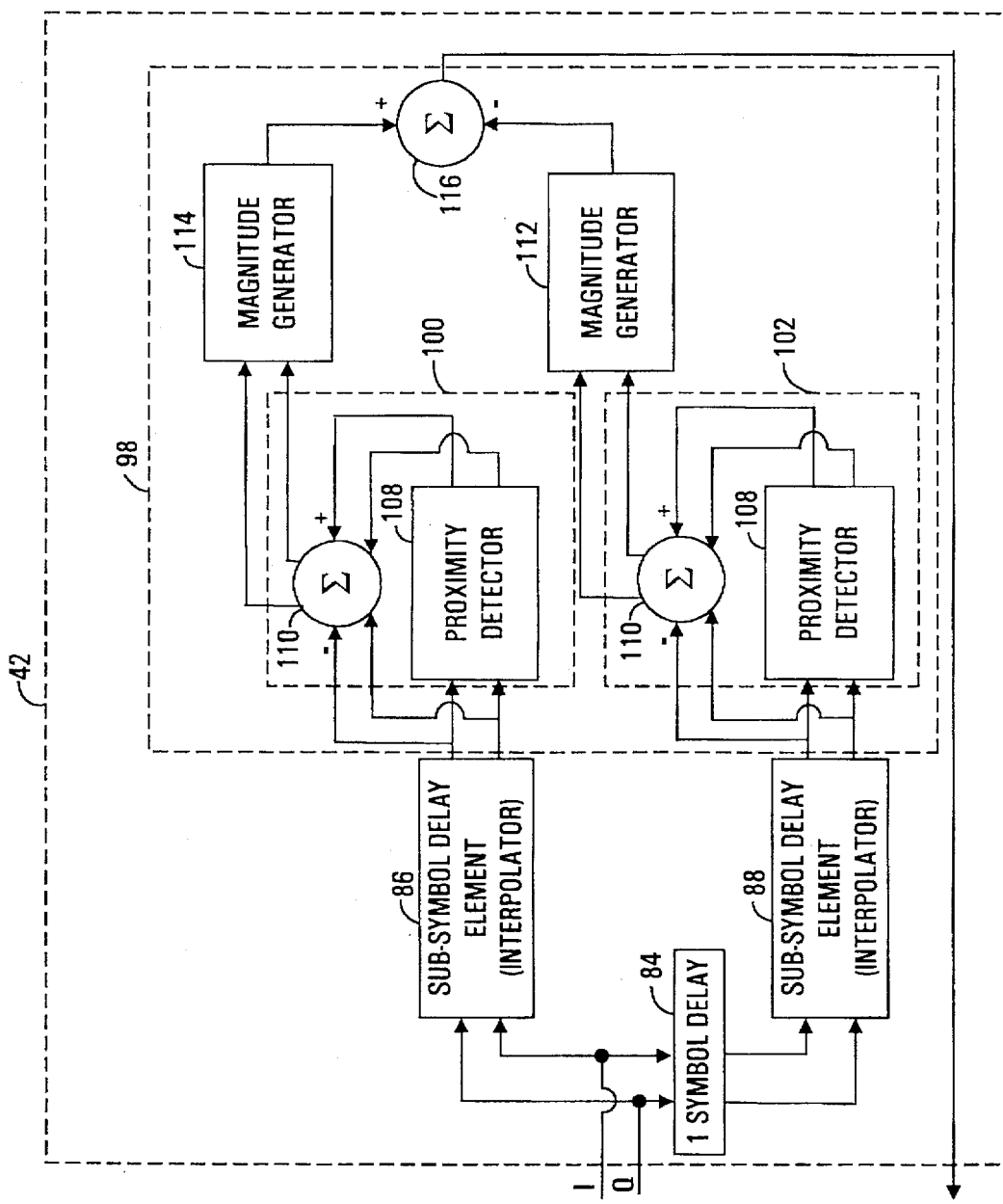
FIG. 6 shows a block diagram of a fine symbol synchronizer.

FIG. 6 shows a detailed block diagram of fine symbol synchronizer #42. Outputs I and Q from quadrature data generator #24 (see FIG. 1) are coupled to inputs of a one symbol delay element #84 and to an input of a sub-symbol delay element (i.e., interpolator) #86. The output of one symbol delay element #84 is coupled to the input of a sub-symbol delay element (i.e., interpolator) #88. Delay elements #86 and #88 may be implemented in the preferred embodiment using interpolators in a manner similar to that described above in connection with delay element #76 (see FIG. 1). Interpolator #86 is configured to receive I and Q samples from quadrature data generator #24 for each symbol and to generate post-sample estimates of an incoming signal at sub-symbol intervals after actual sampling instants. The "post" sample terminology refers to a symbol which is one symbol delayed from a current symbol. Interpolator #88 also receives I and Q samples from quadrature data generator #24, but delayed by one symbol. Interpolator #88 generates pre-sample estimates of an incoming signal at sub-symbol intervals before actual sampling instants relative to the symbol which is one symbol delayed from the current symbol.

Figure 7:
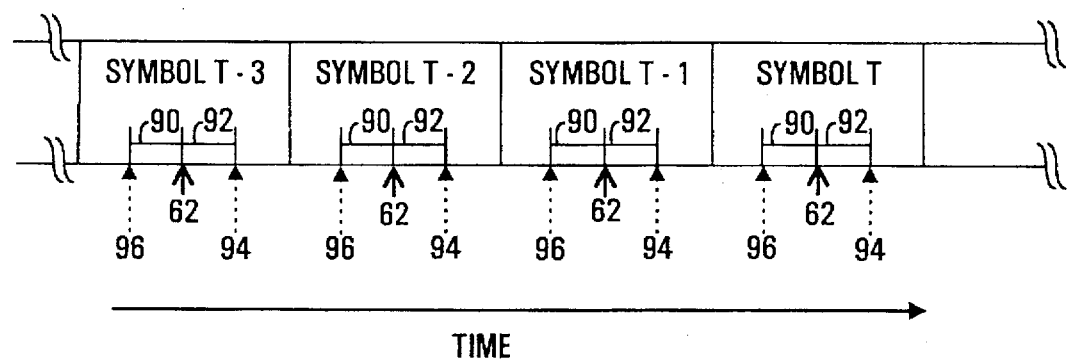
FIG. 7 shows a timing diagram of symbol sample timing.

FIG. 7 illustrates sub-symbol intervals #90 and #92 which occur within each symbol. Symbol sampling instants #62 occur at approximately the mid-point of each symbol. Symbol T-3 occurs prior to time T-2, just as time T-2 occurs prior to symbol T-1, and so on. Pre-sample interval #90 is set equal to post-sample interval #92, with each sub-symbol interval equal to ¼ of one symbol in the preferred embodiment of this invention. Sub-symbol sampling intervals #90 and #92 are desirably set to less than one-half of one symbol, but those skilled in the art will appreciate that the present invention is not limited to the selection of these particular sampling intervals.

To create a post-sample estimate for a sampling which is delayed one symbol from the current sampling instant #62, the complex sampled I and Q values from the current and previous symbols' sample instants #62 are used. In other words, the post-sample estimate at instant #94 during symbol T-1 is derived from the complex I and Q values obtained at sampling time #62 during the current symbol T, factored together with all previous sampling instants. This means that the complex sample taken at instant #62 of symbol T is combined with all previous sampling instants and the result is delayed ¼ of one symbol relative to instant #62 of symbol T-1 to generate the post-sample estimate for symbol T-1. Referring back to FIG. 6, interpolator #86 creates this ¼ symbol interpolation delay from each given sample instant #62 for use as a post-sample estimate of the previous symbol. Thus, interpolator #86 generates post-sample estimates.

To create a pre-sample estimate instant #96 (see FIG. 7) for a particular sample time #62, the complex values I and Q from the previous symbol sample instant #62 are used by being delayed by 1¼ symbol. The pre-sample estimate is generated by interpolator #88 (see FIG. 6) working together with one symbol delay element #84 to interpolate the delayed samples by an additional ¼ symbol.

Quadrature outputs from interpolators #86 and #88 are coupled to quadrature inputs of a combining circuit #98. In particular, outputs from interpolators #86 and #88 couple to quadrature inputs of error detectors #100 and #102, respectively. Error detectors #102 and #100 generate complex "pre" and "post" sample error values by comparing the pre/post sample estimates with standard complex values. Referring back to FIG. 3, a polar representation of quadrature relationships for four complex points #52a, #52b, #52c, and #52d is shown. These points #52a–#52d illustrate theoretically ideal relationships between inphase (I) and quadrature (Q) components of signal, as described above, for the purpose of conveying two bits of data in a single symbol. For example, if an actual sample at a point #104 (see FIG. 3) were taken, the difference between ideal standard complex value #52b and actual complex value #104 can be shown in the form of a vector #106. Vector #106 represents error from the closest standard complex value. The magnitude of this vector indicates the proximity of the actual complex value to the closest "standard" complex value. Combining circuit #98 (see FIG. 6) uses this magnitude component to advance or delay VCO #22 timing during fine symbol synchronization stage #86 (see FIG. 2).

Referring to FIG. 6, each error detector circuit #100 and #102 includes a proximity detector #108 having outputs coupled to a quadrature differencing unit (i.e., a subtractor) #110. Proximity detectors #108 determine differences between actual sampled complex values and "standard" complex values, as discussed above in connection with vector #106 (see FIG. 3). Proximity detectors need not contain all of the circuitry that a normal data detector contains. Proximity detectors #108 represent modified data detectors, such as data detector #50 (see FIG. 1). However, proximity detectors #108 output error vectors #106 (see FIG. 3) and do not require those circuits normally used to output "data."

Quadrature outputs of pre/post error detectors #102 and #100 couple to inputs of magnitude generators #112 and #114 respectively. Magnitude generator #114 is configured to determine post-sample magnitude values and magnitude generator #112 is configured to determine pre-sample magnitude values. Magnitude generators #114, and #112 receive vector quadrature signal outputs from quadrature differencing units #110 and provide absolute scalar magnitude values to a subtraction circuit #116. An output of magnitude generator #114 is coupled to a positive (+) input of subtraction circuit #116 and an output of magnitude generator #112 is coupled to a negative (–) input of subtraction circuit #116. Subtraction circuit #116 determines differences between pre-sample and post-sample scalar magnitude values and uses these differences to advance and retard VCO #22 timing. Desirable sampling instants #62 are obtained when the pre-sample estimate errors equal the post-sample estimate errors. In particular, polarities are arranged so that decreasing magnitude changes from pre-sampling intervals #90 to post-sampling intervals #92 urge VCO #22 to delay the clock signal so that sampling instants #62 are moved later within a symbol. Likewise, increasing magnitude changes urge VCO #22 to advance the clock signal so that sampling instant #62 is moved earlier during fine synchronization stage #82.

An output of subtraction circuit #116 couples to an input of staging switch #30, which couples the output of fine synchronizer #42 to VCO #22 (see FIG. 1) during fine synchronization stage #82 (see FIG. 2). Extraction of data conveyed by incoming signal #12 (see FIG. 1) continues concurrently with fine symbol synchronization #82. Accordingly, fine symbol synchronizer #42 operates in a data-directed mode to refine the coarse data estimates made during stage #28. Running average filter #34 and loop filter #38 together insure that the results from any single symbol have only a minor influence over symbol timing during fine synchronization stage #82 (see FIG. 2).

In summary, the present invention provides an improved symbol synchronization apparatus and method. The present invention may digitally recover symbol timing based on less than two complex samples per symbol. Significant frequency offsets are tolerated during a coarse synchronization stage because symbol timing adjustments are based primarily upon magnitude attributes which have been separated from phase attributes of complex samples. The present invention also achieves steady symbol synchronization in spite of amplitude types of modulation. The present invention continually adjusts fine synchronization during data extraction by advancing or retarding sampling instants in response to pre-sample and post-sample estimates of an incoming signal.

The present invention has been described above with reference to preferred embodiment. However, those skilled in the art will recognize that changes and modifications may be made in these preferred embodiments without departing from the scope of the present invention. For example, those skilled in the art will appreciate that the digital portions of the present invention may be implemented either using discrete components or within a digital signal processor. These and other changes and modifications which are obvious to those skilled in the art are intended to be included within the scope of the present invention.

What is claimed is:

1. A digital demodulator for recovering data conveyed by an incoming analog signal, wherein a unit of said data is conveyed during each of successive symbols, said demodulator comprising:

means for converting said incoming analog signal into less than two complex samples per symbol;

a coarse symbol synchronizer coupled to said converting means to receive said complex samples, said coarse symbol synchronizer generating an initial estimate of symbol synchronization and defining initial sampling instants; and a fine symbol synchronizer coupled to said converting means to receive said samples, said fine symbol synchronizer being configured to refine said initial estimate of symbol synchronization in a data-directed manner and to estimate said incoming signal at sub-symbol intervals before and after said sampling instants.

2. A digital demodulator as claimed in claim 1 wherein said coarse symbol synchronizer is configured to generate said initial estimate of symbol synchronization in a non-data-directed manner.

3. A digital demodulator as claimed in claim 1 wherein:

said digital demodulator additionally comprises a controllable oscillator, said oscillator generating a clock signal which defines symbol timing;

said converting means comprises an analog-to-digital converter coupled to said oscillator;

said coarse symbol synchronizer comprises a phase processor, coupled to said analog-to-digital converter, for identifying clock adjustment opportunities in response to phase relationships exhibited by said complex samples; and said coarse symbol synchronizer additionally comprises a magnitude processor, coupled to said analog-to-digital converter, said phase processor, and said oscillator, for adjusting said symbol timing defined by said clock signal in response to magnitude relationships exhibited by said complex samples at approximately said identified clock adjustment opportunities.

4. A digital demodulator as claimed in claim 1 wherein said demodulator additionally comprises a controllable oscillator coupled to said converting means to define said sampling instants, and said fine symbol synchronizer comprises:

a first interpolator configured to receive said samples and to generate pre-sample estimates of said incoming signal at said sub-symbol intervals before said sampling instants;

a second interpolator configured to receive said samples and to generate post-sample estimates of said incoming signal at said sub-symbol intervals after said sampling instants; and a combining circuit coupled to said oscillator and being configured to advance and retard said sampling instants in response to said pre-sample estimates and said post-sample estimates of said incoming signal.

5. A digital demodulator as claimed in claim 4 wherein said combining circuit comprises:

a first error detector configured to generate complex pre-sample error values between said pre-sample estimates and standard complex values;

a second error detector configured to generate complex post-sample error values between said post-sample estimates and said standard complex values;

a first magnitude generator coupled to said first error detector for determining pre-sample magnitude values from said pre-sample error values;

a second magnitude generator coupled to said second error detector for determining post-sample magnitude values from said post-sample error values; and a subtraction circuit having an output coupled to said oscillator and being configured to determined differences between said pre-sample magnitude values and said post-sample magnitude values.

6. A digital demodulator as claimed in claim 1 wherein said sub-symbol intervals occurring before said sampling instants equals said sub-symbol intervals occurring after said sampling instants.

7. A digital demodulator as claimed in claim 1 wherein said sub-symbol sampling intervals are less than one half of said symbols.

8. A digital demodulation method for recovering data conveyed by an incoming analog signal, wherein a unit of said data is conveyed during each of successive symbols, and said method comprises the steps of:

a) converting said incoming analog signal into less than two complex samples per symbol;

b) generating a coarse estimate of symbol timing for said incoming signal, said generating step defining initial sampling instants;

c) estimating said incoming signal at sub-symbol intervals before and after said sampling instants; and d) generating a fine estimate of symbol timing in response to said incoming signal estimates of said step c), said generating step d) refining said coarse estimate of symbol timing in a data-directed manner.

9. A method as claimed in claim 8 additionally comprising the step of performing carrier phase synchronization after said step b) and before said step d).

10. A method as claimed in claim 8 wherein said generating step b) comprises the step of performing a non-data-directed symbol synchronization.

11. A method as claimed in claim 8 wherein said step b) comprises the steps of:

generating a clock signal which defines said sampling instants, said step a) being responsive to said clock signal;

identifying clock adjustment opportunities in response to phase relationships exhibited by said complex samples; and adjusting said symbol timing defined by said clock signal in response to magnitude relationships exhibited by said complex samples at approximately said identified clock adjustment opportunities.

12. A method as claimed in claim 8 wherein said sub-symbol intervals occurring before said sampling instants equal said sub-symbol intervals occurring after said sampling instants.

13. A method as claimed in claim 8 wherein said sub-symbol sampling intervals are less than one half of said symbols.

14. A method as claimed in claim 8 additionally comprising the steps of:

generating a clock signal which defines said sampling instants, said step a) being responsive to said clock signal;

generating pre-sample estimates of said incoming signal at said sub-symbol intervals before said sampling instants;

generating post-sample estimates of said incoming signal at said sub-symbol intervals after said sampling instants; and advancing and retarding said sampling instants in response to said pre-sample estimates and said post-sample estimates of said incoming signal.

15. A method as claimed in claim 14 wherein said advancing and retarding step comprises the steps of:

generating complex pre-sample error values between said pre-sample estimates and standard complex values;

generating complex post-sample error values between said post-sample estimates and said standard complex values;

determining pre-sample magnitude values from said complex pre-sample error values;

determining post-sample magnitude values from said complex post-sample error values; and determining differences between said pre-sample magnitude values and said post-sample magnitude values, said sampling instants being advanced and retarded in response to said differences.

16. A digital demodulator for recovering data conveyed by an incoming signal that is sampled at a rate of less than two samples per symbol, said demodulator comprising:

an RF section having an input coupled to an antenna and an output coupled to an input of an analog preconditioning circuit;

an analog-to-digital converter for converting said incoming analog signal into less than two complex samples per symbol;

a controllable oscillator coupled to said analog-to-digital converter, said oscillator defining sampling instants at which said analog-to-digital converter converts said incoming signal;

a coarse symbol synchronizer coupled to said analog-to-digital converter and said oscillator, said coarse symbol synchronizer being configured to receive said complex samples, said coarse symbol synchronizer generating an initial estimate of symbol synchronization; and a fine symbol synchronizer coupled to said analog-to-digital converter and said oscillator, said fine symbol synchronizer being configured to receive said samples, said fine symbol synchronizer being configured to refine said initial estimate of symbol synchronization in a data-directed manner, to estimate said incoming signal at sub-symbol intervals before and after said sampling instants, and to control said oscillator in response to said incoming signal estimates.

17. A digital demodulator as claimed in claim 16 wherein said fine symbol synchronizer comprises:

a first interpolator configured to receive said samples and to generate pre-sample estimates of said incoming signal at said sub-symbol intervals before said sampling instants;

a second interpolator configured to receive said samples and to generate post-sample estimates of said incoming signal at said sub-symbol intervals after said sampling instants; and a combining circuit coupled to said first and second interpolators and said oscillator, said combining circuit being configured to advance and retard said sampling instants in response to said pre-sample estimates and said post-sample estimates of said incoming signal.

18. A digital demodulator as claimed in claim 17 wherein said combining circuit comprises:

a first error detector configured to generate complex pre-sample error values between said pre-sample estimates and standard complex values;

a second error detector configured to generate complex post-sample error values between said post-sample estimates and said standard complex values;

a first magnitude generator coupled to said first error detector for determining pre-sample magnitude values from said pre-sample error values;

a second magnitude generator coupled to said second error detector for determining post-sample magnitude values from said post-sample error values; and a subtraction circuit having an output coupled to said oscillator and being configured to determine differences between said pre-sample magnitude values and said post-sample magnitude values.

19. A digital demodulator as claimed in claim 16 wherein said coarse symbol synchronizer comprises:

a phase processor, coupled to said analog-to-digital converter, for identifying clock adjustment opportunities in response to phase relationships exhibited by said complex samples; and a magnitude processor, coupled to said analog-to-digital converter, said phase processor, and said oscillator, for adjusting said symbol timing defined by said clock signal in response to magnitude relationships exhibited by said complex samples at approximately said identified clock adjustment opportunities.

* * * * *